United States Patent
Zhang et al.

(10) Patent No.: US 8,961,833 B2
(45) Date of Patent: Feb. 24, 2015

(54) FLUORINATED CARBON COMPOSITE CATHODE FOR A HIGH-ENERGY LITHIUM BATTERY

(75) Inventors: Shengshui Zhang, Olney, MD (US); Donald L. Foster, Laurel, MD (US); Jeffery Wolfenstine, Silver Spring, MD (US); Jeffery A. Read, West Friendship, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 117 days.

(21) Appl. No.: 13/206,895

(22) Filed: Aug. 10, 2011

(65) Prior Publication Data

US 2012/0126182 A1      May 24, 2012

Related U.S. Application Data

(60) Provisional application No. 61/416,923, filed on Nov. 24, 2010.

(51) Int. Cl.
*H01B 1/06*         (2006.01)
*H01M 4/583*      (2010.01)
(Continued)

(52) U.S. Cl.
CPC ............ *H01M 4/5835* (2013.01); *H01M 4/622* (2013.01); *H01M 4/623* (2013.01); *H01M 10/052* (2013.01); *Y02E 60/122* (2013.01)
USPC ........... 252/507; 252/500; 252/506; 252/508; 252/509; 252/512; 252/513; 429/215; 429/218.1; 429/405

(58) Field of Classification Search
CPC ... H01M 4/622; H01M 10/052; H01M 4/669; H01M 4/661
USPC ......... 252/506, 507, 508, 509, 512, 513, 500; 429/207, 300, 330, 405, 215, 218.1; 560/187, 195
See application file for complete search history.

(56) References Cited

U.S. PATENT DOCUMENTS

| 4,681,823 A | 7/1987 | Tung et al. |
| 4,686,161 A | 8/1987 | Shia et al. |

(Continued)

OTHER PUBLICATIONS

Sheng S. Zhang, Donald Foster, JeffWolfenstine, Jeffrey Read,Electrochemical characteristic and discharge mechanism of a primary Li/CFx cell.Journal of Power Sources, 187 (2009) 233-237. Published by Elsevier B.V.*

(Continued)

*Primary Examiner* — Bijan Ahvazi
(74) *Attorney, Agent, or Firm* — Avrom David Spevack; John H. Raubitschek

(57) ABSTRACT

A lithium/fluorinated carbon ($Li/CF_x$) battery having a composite cathode including an electroactive cathode material, a non-electroactive additive, a conductive agent, and a binder. The electroactive cathode material is a single fluorinated carbon having a general formula of $CF_x$, whereby x is an averaged value ranging from about 0.5 to about 1.2. The non-electroactive additive is at least one or a mixture of two or more oxides selected from the group comprising Mg, B, Al, Si, Cu, Zn, Y, Ti, Zr, Fe, Co, or Ni. The conductive agent is selected from the group comprising carbon, metals, and mixtures thereof. Finally, the binder is an amorphous polymer selected from the group comprising fluorinated polymers, ethylene-propylene-diene (EPDM) rubbers, styrene butadiene rubbers (SBR), poly (acrylonitrile-methyl methacrylate), carboxymethyl celluloses (CMC), and polyvinyl alcohol (PVA). Also, a method of reducing the initial voltage drop of a lithium/fluorinated carbon ($Li/CF_x$) battery by providing a composite cathode which includes an electroactive cathode material having a general formula of $CF_x$, whereby x is an averaged value ranging from about 0.5 to about 1.2, a non-electroactive additive, a conductive agent, and a binder.

18 Claims, 5 Drawing Sheets

(51) Int. Cl.
  *H01M 4/62* (2006.01)
  *H01M 10/052* (2010.01)
  *H01B 1/00* (2006.01)
  *H01B 1/12* (2006.01)
  *H01B 1/24* (2006.01)

(56) References Cited

U.S. PATENT DOCUMENTS

| | | | |
|---|---|---|---|
| 4,765,968 A | 8/1988 | Shia et al. | |
| 4,791,038 A | 12/1988 | Shia et al. | |
| 5,114,811 A * | 5/1992 | Ebel et al. | 429/337 |
| 5,667,916 A * | 9/1997 | Ebel et al. | 429/219 |
| 6,194,099 B1 * | 2/2001 | Gernov et al. | 429/213 |
| 6,201,100 B1 * | 3/2001 | Gorkovenko et al. | 528/388 |
| 7,052,802 B2 | 5/2006 | Tsukamoto et al. | |
| 2006/0115579 A1 * | 6/2006 | Mukherjee et al. | 427/58 |

OTHER PUBLICATIONS

Akiya Kozawa, "Lithium-MnO2 Cells Containing CFx or C2F in the Cathode," 134 J. Electrochem. Society 780-82 (1987).

M. Stanley Whittingham, "Mechanism of Reduction of the Fluorographite Cathode," 122 J. Electrochem. Society 526-27(1975).

N. Watanabe et al., "On the Relationship Between the Overpotentials and Structures of Graphite Fluoride Electrode in Nonacqueous Lithium Cell," 131 J. Electrochem. Society 1980-84 (1984).

\* cited by examiner

FLUORINATED CARBON COMPOSITE CATHODE FOR A HIGH-ENERGY LITHIUM BATTERY

CROSS-REFERENCE TO RELATED APPLICATION

This application claims benefit of U.S. Provisional Patent Application No. 61/416,923, filed on Nov. 24, 2010, the complete disclosure of which, in its entirety, is herein incorporated by reference.

GOVERNMENT INTEREST

The embodiments described herein may be manufactured, used, sold, imported and/or licensed by or for the United States Government without the payment of royalties thereon.

BACKGROUND

1. Technical Field

The embodiments described herein generally relate to a lithium/fluorinated carbon ($Li/CF_x$) battery. More particularly, the embodiment relates to a $CF_x$ composite cathode and method for reducing the initial voltage drop of a $Li/CF_x$ battery.

2. Description of the Related Prior Art

Fluorinated carbon or carbon fluoride ($CF_x$) is well known for its stable properties and is widely used in lithium carbon monoflouride ($Li/CF_x$) batteries as the cathode. $Li/CF_x$ batteries are known as having the highest theoretical specific capacity as compared with other commercial lithium batteries, such as lithium thionyl chloride ($Li/SOCl_2$) batteries and lithium manganese dioxide ($Li/MnO_2$) batteries.

The $Li/CF_x$ batteries are generally based upon the reaction $CF_x + xLi \rightarrow C + xLiF$, which indicate that the specific capacity of such batteries depends on the content of fluorine (i.e., the value x) in the formula $CF_x$. Theoretically, a $CF_x$ cathode material having an averaged x value of 1.0 can have a specific capacity as high as 865 mAh/g. The standard electrode potential and electronic conductivity of the $CF_x$ material are highly dependent upon the value x.

It has been demonstrated that the potential and conductivity of $CF_x$ materials have a general tendency to increase when a decrease in the x value is realized. Consequently, there exists a trade-off between the cell capacity and cell performance. That is, in order to maximize the battery capacity, the battery performance is compromised and the inverse is true. Further, $CF_x$ materials having an x value approaching 1 are intrinsically non-conductive. Therefore, a high energy density $Li/CF_x$ battery that requires a high x value (i.e., values of 1 or greater) suffers very high internal resistance, which not only reduces the battery's operating voltage but also causes heat generation.

Despite the above noted superiority of the $Li/CF_x$ battery, these batteries are also known by those skilled in the art as having major disadvantages including: (1) significant voltage drop in the initial discharge period; (2) poor power capability; and (3) heat generation that accompanies with the discharge process, especially at high discharge rate. In particular, the initial voltage drop is due to the substantially low conductivity of the $CF_x$ cathode material and the following recovery of the cell's voltage in early discharge periods originates from the formation of conductive carbon as one of the final discharge products. The poor power capability is due to the slow kinetics of the cell reaction, which reflects as high cell resistance. Meanwhile, the high cell resistance results in heat generation. Since all disadvantages addressed above are related to the intrinsically low conductivity of the $CF_x$ cathode material, numerous disclosures made in the prior art are focused on the improvement of the electronic conductivity of the $CF_x$ composite cathodes. Such prior art efforts can be classified as three categories of: (1) lowering the content of fluorine in $CF_x$ via a physical or a chemical manner, which certainly accompanies a decrease in the specific capacity; (2) adding a second cathode material that has a higher discharge voltage to compensate for the initial voltage drop of the $CF_x$ cathode; and (3) adding highly conductive filler or coating the $CF_x$ cathode material with a highly conductive metal layer. These disclosures are illustrated in the following references discussed in detail below.

U.S. Pat. No. 5,667,916, to Ebel et al. discloses a cathode material mixture comprising a major portion of fluorinated carbon and a minor portion of metal-containing material. Examples of the second cathode material as the minor portion of the cathode active mixture include bismuth dioxide ($Bi_2O_3$), bismuth lead oxide ($Bi_2Pb_2O_5$), copper sulfide (CuS), copper chloride ($CuCl_2$), copper oxide (CuO), iron sulfide (FeS), iron disulfide ($FeS_2$), molybdenum oxide ($MoO_3$), nickel sulfide ($Ni_3S_2$), silver oxide ($Ag_2O$), silver chloride (AgCl), copper vanadium oxide ($CuV_2O_5$), copper silver vanadium oxide ($Cu_xAg_yV_2O_z$) and mercury oxide (HgO), and mixtures thereof. In these examples, the second cathode material in the cathode active mixture is in a percentage ranging from 15% to 40% by weight.

U.S. Pat. No. 4,791,038, to Shia et al. discloses the chemical treatment of fluorinated carbon with an alkali metal alkyl or aryl compound, which gives a partial reduction of $CF_x$ and as a result, reduces or almost eliminates the initial voltage drop of $Li/CF_x$ batteries. However, in each of the above patents, there are extra process steps, which not only increase battery cost, but also reduce the specific capacity of $CF_x$ cathode material as a result of partial defluorination by the chemical treatment.

Despite of the numerous approaches disclosed in the related prior art, there still remains a need for an improved and practical fluorinated carbon composition that substantially reduces the initial voltage drop of the $Li/CF_x$ batteries.

SUMMARY

In view of the foregoing, an embodiment herein provides a composite cathode for a lithium/fluorinated carbon ($Li/CF_x$) battery, which includes an electroactive cathode material, a non-electroactive additive, a conductive agent and a binder.

Such an embodiment further includes the electroactive cathode material being a single fluorinated carbon having a formula of $CF_x$, where x is an averaged value ranging from about 0.5 to about 1.2, in a range from about 60% to about 95% by weight.

Additionally, the non-electroactive additive is a single oxide or at least two oxides comprising an element selected from the group Mg, B, Al, Si, Cu, Zn, Y, Ti, Zr, Fe, Co, and Ni and is present in a percentage, by weight, ranging from about 1% to about 10%.

Moreover, the conductive agent is selected from the group comprising carbon, graphite, metals, and mixtures thereof and is present in a percentage, by weight, ranging from about 5% to about 15%.

The binder is present in a percentage, by weight, ranging from about 1% to about 10% and is an amorphous polymer selected from the group comprising fluorinated polymers, ethylene-propylene-diene (EPDM) rubbers, styrene butadiene rubbers (SBR), poly(acrylonitrile-methyl methacrylate), carboxymethyl celluloses (CMC), and polyvinyl alcohol (PVA).

Moreover, an embodiment herein provides a lithium/fluorinated carbon (Li/CF$_x$) battery including an electroactive cathode material, a non-electroactive additive, a conductive agent, and a binder. The non-electroactive additive reduces initial voltage drop.

The conductive agent is selected from the group comprising carbon, graphite, metals, and mixtures thereof and is present in a percentage, by weight, ranging from about 5% to about 15%.

The binder is present in a percentage, by weight, ranging from about 1% to about 10% and is an amorphous polymer selected from the group comprising fluorinated polymers, ethylene-propylene-diene (EPDM) rubbers, styrene butadiene rubbers (SBR), poly(acrylonitrile-methyl methacrylate), carboxymethyl celluloses (CMC), and polyvinyl alcohol (PVA).

Moreover, another embodiment includes a method of reducing the initial voltage drop of a lithium/fluorinated carbon (Li/CF$_x$) battery including providing an electroactive cathode material present in a percentage, by weight, ranging from about 60% to 95%, providing a non-electroactive additive present in a percentage, by weight, ranging from about 1% to about 10%, and providing a conductive agent present in a percentage, by weight, ranging from about 5% to about 15%; and providing a binder present in a percentage, by weight, ranging from about 1% to about 10%.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
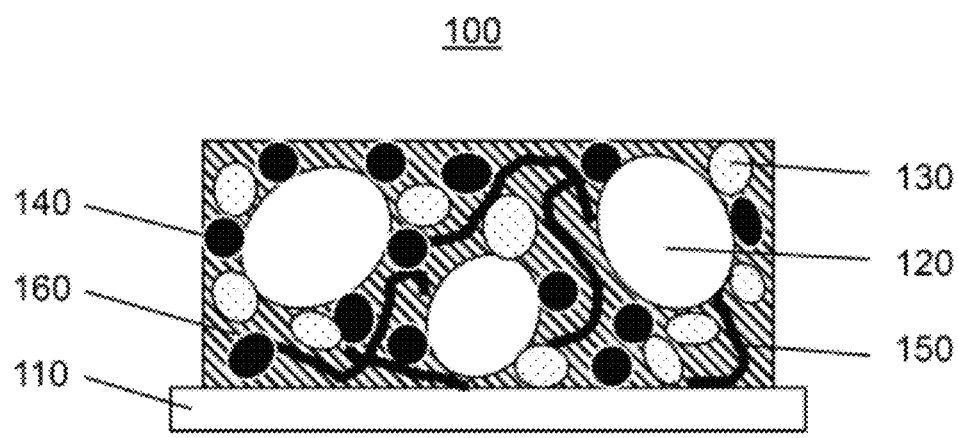
FIG. 1 illustrates a schematic diagram of the composite Li/CF$_x$ cathode, according to an embodiment described herein.

The embodiments herein and the various features and advantages thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of ordinary skill in the art to practice the embodiments herein. Accordingly, the examples should not be construed as limiting the scope of the embodiments herein.

Referring now to the drawings, and more particularly to FIGS. 1 through 6, where similar reference characters denote corresponding features consistently throughout the figures, there are shown preferred embodiments.

Generally, the initial voltage drop of the Li/CF$_x$ battery of the embodiments disclosed herein is substantially reduced by the addition of a non-electroactive additive. In particular, the non-electroactive additive serves as a catalyst to promote the discharge reaction of CF$_x$+xLi→C+xLiF. This practice is based on a widely accepted two-step mechanism known by those of ordinary skill in the art. Typically, according to this two-step mechanism, the CF$_x$ is first reduced to form an intermediate compound, C(LiF)$_x$; the intermediate compound is then decomposed into the final products C and LiF, as expressed by the equations below:

$$x\text{Li} + \text{CF}_x \rightarrow \text{C(LiF)}_x \qquad [1]$$

$$\text{C(LiF)}_x \rightarrow \text{C} + x\text{LiF} \qquad [2]$$

In the above equations, C(LiF)$_x$ represents a discharging intermediate compound; in most cases the intermediate compound is solvated by one or more of electrolyte solvent molecules. It is noted that the second step (equation 2) greatly affects the discharge characteristic of a Li/CF$_x$ battery although it does not involve any electron transferences. It is likely that the non-electroactive additive serves as a catalyst to promote the decomposition of the discharge intermediate compound, C(LiF)$_x$. The addition of a non-electroactive additive is shown to facilitate the second step because the non-electroactive additive catalyzes the decomposition of the discharge intermediate compound.

Referring to FIG. 1, illustrated is a composite cathode 100 configuration on a current collector 110. A non-electroactive additive 130 mixes with CF$_x$ electroactive cathode material 120. Further, a conductive fiber 150 surrounds a conductive agent 140 and the CF$_x$ cathode material 120. All the components are bound together by a binder 160 to form the composite cathode 100. It should be appreciated that the above cathode may be utilized, among other things, as the cathode in a typical commercial Li/CF$_x$ battery. Generally, commercial batteries are well known as including an anode, cathode and an organic electrolyte, which will be described in further detail below.

Typically, anodes of commercial lithium batteries are electrodes composed of a foil having metallic lithium or lithium-based alloys. Further, several types of electrolytes are utilized in these batteries including but not limited to: non-aqueous liquid electrolyte, solid electrolytes, solid polymer electrolyte, or a gel polymer electrolyte. Each electrolyte has unique properties and compositions. However, for the purposes of experiments conducted herein, non-aqueous liquid electrolytes, have been utilized and will be discussed in further detail below. It is to be noted that the embodiments herein are not limited to the use of the above-mentioned electrolytes and any known commercial available electrolytes may be used accordingly.

Generally, a non-aqueous liquid electrolyte is a solution prepared by dissolving one or more lithium salts in an organic solvent or a blend comprising multiple organic solvents. Examples of lithium salts suitable for use in the non-aqueous liquid electrolyte may include, but are not limited to: $LiPF_6$, $LiAsF_6$, $LiSbF_6$, LiI, $LiAlCl_4$, $LiGaCl_4$, $LiClO_4$, LiSCN, $LiCH_3CO_2$, $LiCF_3CO_2$, $LiBF_4$, $LiBF_3Cl$, $LiB(C_2O_4)_2$, $LiB(C_2O_4)F_2$, $LiB(OCH_2CO_2CO_2)F_2$, $LiB(C_6H_5)_4$, $LiCH_3SO_3$, $LiCF_3SO_3$, $LiN(SO_2CF_3)_2$, $LiC(SO_2CF_3)_3$, and mixtures thereof. Further, examples of organic solvents for use in the non-aqueous liquid electrolyte include, but are not limited to: 1,2-dimethoxyethane, 1,2-diethoxyethane, tetrahydrofuran, dioxolane, dimethyl carbonate, diethyl carbonate, ethyl methyl carbonate, methyl propyl carbonate, ethyl propyl carbonate, dipropyl carbonate, propylene carbonate, ethylene carbonate, butylene carbonate, gamma-butyrolactone, methyl acetate, methyl propionate, methyl butyrate, diglyme, triglyme, tetraglyme, acetonitrile, dimethyl formamide, N-methyl acetamide, dimethyl acetamide, N-methyl-pyrrolidinone, dimethyl sulfoxide, sulfolanes, sulfones, and mixtures thereof. It is noted that when utilizing non-aqueous liquid electrolytes in $Li/CF_x$ batteries, a porous separator must be placed between the cathode and the anode to ensure that the two electrodes do not become short circuited.

Turning to FIG. 1, non-electroactive additive 130 may be a single oxide or a mixture of multiple oxides, in a weight percentage that ranges from about 1% to about 10%, selected from the oxides of the group: Magnesium (Mg), Boron (B), Aluminum (Al), Silicon (Si), Copper (Cu), Zinc (Zn), Yttrium (Y), Titanium (Ti), Zirconium (Zr), Iron (Fe), Cobalt (Co), and Nickel (Ni). Since the catalytic effect is highly dependent upon the chemistry and surface structure of the oxide(s), optimum performance can be obtained with the combination of two or more oxides, however, the embodiments herein are not limited thereto. For example, iron oxides, such as, for example having the forms $Fe_2O_3$, FeO, $Fe_3O_4$, and mixtures thereof, are effective with regard to reducing the initial voltage drop and enhancing the voltage of the $Li/CF_x$ battery as well as increasing the utilization of the $CF_x$ active material. Conversely, other oxides, such as, for example oxides selected from the group of $Al_2O_3$, $SiO_2$, $TiO_2$, $ZrO_2$, and mixtures thereof, are beneficial with improving the initial voltage of a battery. Therefore, the combination of an iron oxide with oxides from the above respective lists provides more flat discharge voltage curves as compared with batteries not containing non-electroactive additives. It is noted that in order to maximize the effectiveness of the catalytic effect, oxides having small particle sizes are desirable but the embodiments herein are not limited thereto.

Additionally, the non-electroactive additive 130 provides a nucleation site for the formation of final discharge products, C and LiF, as represented by equation (2), above. The non-conductive discharge product, LiF, is preferably deposited on the surface of the non-electroactive additive, which then makes the leaving $CF_x$ material more accessible for $Li^+$ ions in the electrolyte of the battery. Thus, the presence of the non-electroactive additive 130 essentially serves as a catalyst to facilitate the reduction of the initial voltage drop of the $Li/CF_x$ battery.

The electroactive cathode material 120 is a single $CF_x$ material or a mixture of multiple $CF_x$ materials having different x values. The x in formula $CF_x$ represents an averaged value, and is generally in a range from about 0.5 to about 1.2, preferably from about 0.9 to about 1.1. In addition to the variation in the x value, numerous sources of carbons are available for the preparation of the $CF_x$ materials, including, but not limited to: cokes, carbon fibers, natural graphite, synthetic graphite, and a variety of carbon blacks. Further, the electroactive cathode material is in a weight percentage ranging from about 60% to about 95%, preferably from about 70% to about 90%. Moreover, the theoretical specific capacity of $CF_x$ cathode materials is determined by value x. Thus, a high x value is required in order to produce a high energy density $Li/CF_x$ battery.

Since the discharge of the $Li/CF_x$ battery is followed by a significant volumetric expansion and structural exfoliation of the $CF_x$ material, leading to a loss in the electronic contact between electrode components, the combination of a bulk proportion carbon particles with a small proportion carbon fiber is desirable to stabilize the overall conductivity of the composite electrode. In addition, conductive agent 140 is generally required in order to provide electronic conductivity for the discharge reaction of the $Li/CF_x$ battery. Examples of such conductive agents include, but are not limited to, carbon fibers, powders and carbon filaments. Additionally, conductive agent 140 may be represented as an amorphous carbon, including but not limited to, Shawingan Acetylene Black (SAB-50®), PRINTEX L®, PRINTEX L6®, PRINTEX XE-2®, Monarch 700®, VULCAN XC72R®, BLACK PEARL 2000®, FW200®, or carbon acrogel. However, conductive agent 140 is not limited to the examples cited above and can be represented in other forms such as graphites, metals, or mixtures thereof. Further, notwithstanding the general form, the conductive agent 140 has a weight percentage ranging from about 1% to about 15%, preferably from about 5% to about 10%.

Binder 160 is used to bond all electrode components together. The binder 160 may be a fluorinated polymer, for example, polytetrafluoroethylene (PTFE), polyvinylidene fluoride (PVDF), and PVDF-based copolymers, having a weight percentage ranging from about 1% to about 10%. However, binder 160 is not limited to the examples cited above and as such, may include alternative types of polymers, such as fluorinated polymers, ethylene-propylene-diene (EPDM) rubbers, styrene butadiene rubbers (SBR), poly (acrylonitrile-methyl methacrylate), carboxymethyl cellulose (CMC), and polyvinyl alcohol (PVA).

Further, composite cathode 100 includes a metal current collector 110. The current collector 110 may be fabricated of materials including but not limited to carbon, nickel, titanium, aluminum, or stainless steel and may further be represented in various forms. For example, composite cathode 100 may be coated on a metal foil, wherein the metal foil will act as the current collector. Similarly, composite cathode 100 may be pasted and pressed onto a metal grid thereby acting as a current collector. Alternatively, composite cathode 100 may be pressed as forms of self-standing sheets or pellets. It is to be appreciated that the current collector is not limited to the embodiments described herein and may be represented in any suitable form known to those having ordinary skill in the art.

The embodiments herein will further be described by the following specific examples. It should be understood, however, that although these examples may describe in detail certain preferred operating conditions of the embodiments herein, they are given primarily for purposes of illustration and the embodiments in its broader aspects are not limited thereto.

Example 1

A cathode slurry formulation of 85% $CF_x$, 10% SAB-50, and 5% PVDF by weight was prepared by using N-methylpyrrolidinone as the solvent. The total solid content of the slurry was about 25%. The obtained slurry was then coated onto an aluminum foil as the current collector using a doctor-blade having a gap of 10 milli-inch. After drying in an 80° C. oven, the resulting composite cathode sheet was punched into small discs with a diameter of 0.5 inch, followed by further drying at 105° C. under vacuum for 12 hours. The dried composite cathode discs were immediately transferred into a glove-box for assembly of the Li/CF$_x$ coil cells. The same procedure was used to coat another cathode having a composition of 85% CF$_x$, 8% SAB-50, 2% carbon filament, and 5% PVDF.

Figure 2A:
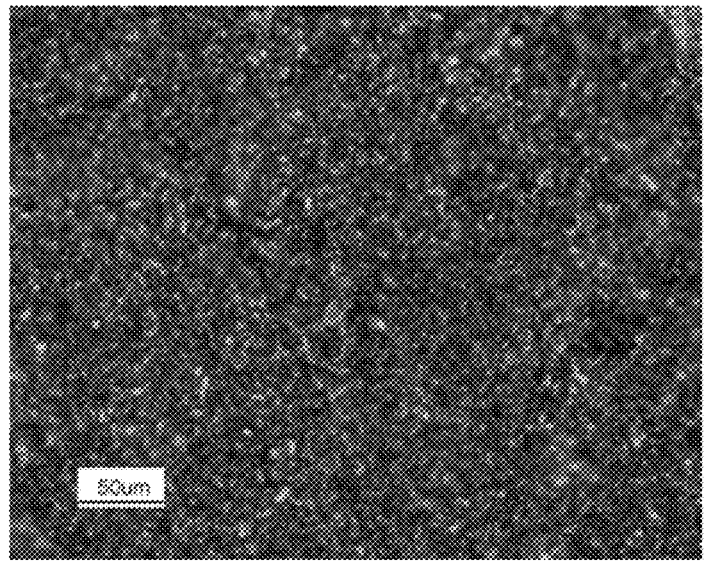
FIGS. 2A-2B illustrate microscope images of the composite cathode surface, according to an embodiment described herein.
Figure 2B:
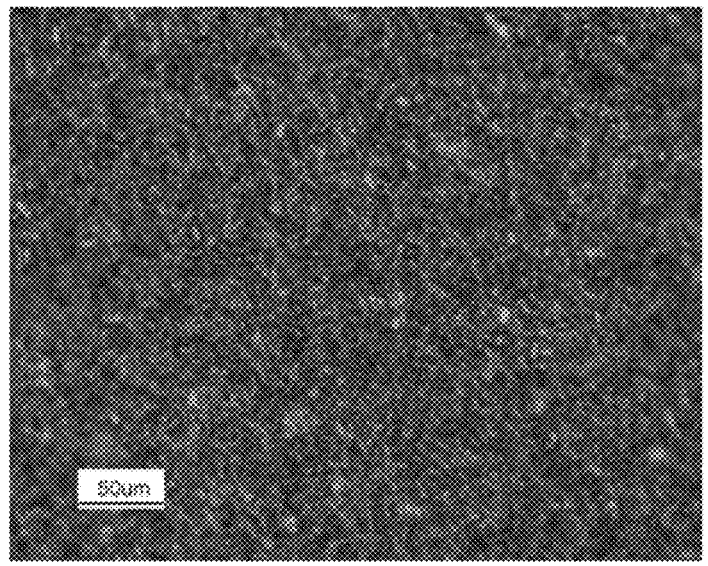

FIGS. 2A-2B illustrate microscopic surface images of the above two composite cathodes 100. In particular, FIG. 2A is the surface image of the composite cathode having a cathode-formulation of 85% CF$_x$, 10% SAB-50, and 5% PVDF. FIG. 2B illustrates the surface of the composite cathode 100, wherein 2% of the SAB-50 is replaced with fabric carbon filament. It is to be noted that, in FIG. 2B, containing the fabric carbon filament, there are numerous carbon fibers randomly dispersed throughout the sheet. Such structures not only enhance the adhesion of the cathode components to the current collector 110, but also favor stabilizing the integrity of the composite cathode 100 during discharge of the Li/CF$_x$ battery.

Example 2

Figure 3:
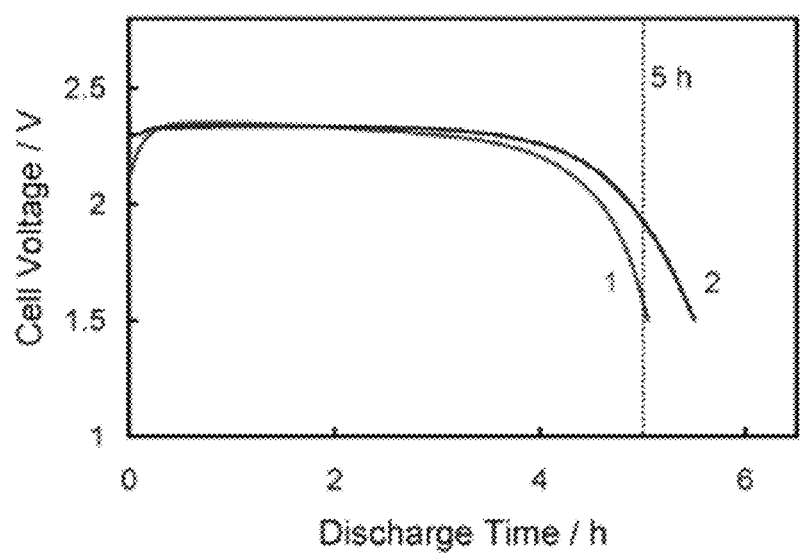
FIG. 3 illustrates a graph demonstrating the effects of the addition of fabric carbon filament on discharge voltage, according to an embodiment described herein.

In this example, two composite cathodes having the compositions: Cell-1: 80% CF$_x$, 5% Fe$_2$O$_3$, 10% SAB-50, and 5% PVDF and Cell-2: 80% CF$_x$, 5% Fe$_2$O$_3$, 9% SAB-50, 1% carbon filament, and 5% PVDF were prepared using the same method described in Example 1. Each cathode disc was weighed and then used to assemble a coin cell. The coin cell was assembled by using a 4 milli-inch thickness lithium foil as the anode, a Celgard 3500 membrane as the separator, and a solution of 0.5 m (mole per kilogram) LiBF$_4$ dissolved in a 1:1 (by weight) mixture of 1,2-dimethoxyethane (DME) and propylene carbon (PC) as the electrolyte. In order to make a fair comparison, the cell was activated with a fixed amount of liquid electrolyte (i.e., 20 microliters) and stored at room temperature for 5 hours prior to the discharge test. Based on the weight and theoretical capacity of the CF$_x$ active material, a 0.2 C current rate was calculated and used to discharge the cell until the cell's voltage declined to 1.5 V. FIG. 3 shows the discharge voltage curves 1 and 2 of Cell-1 and Cell-2, respectively. It is indicated that Cell-2, with its cathode containing 1% carbon filament, has higher initial voltage and longer discharge time than Cell-1 which does not contain carbon filament.

Example 3

Figure 4A:
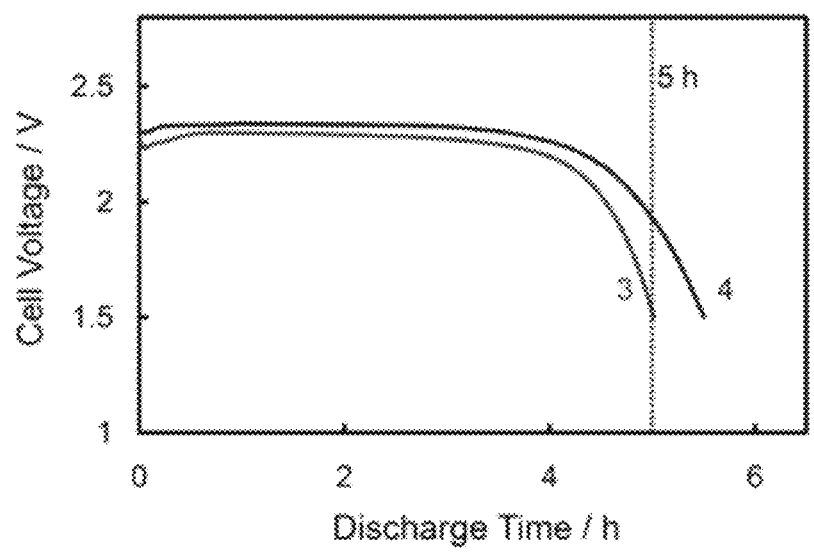
FIGS. 4A-4B illustrate graphs demonstrating the effects of the addition of Fe$_2$O$_3$ on discharge voltage, according to an embodiment described herein.
Figure 4B:
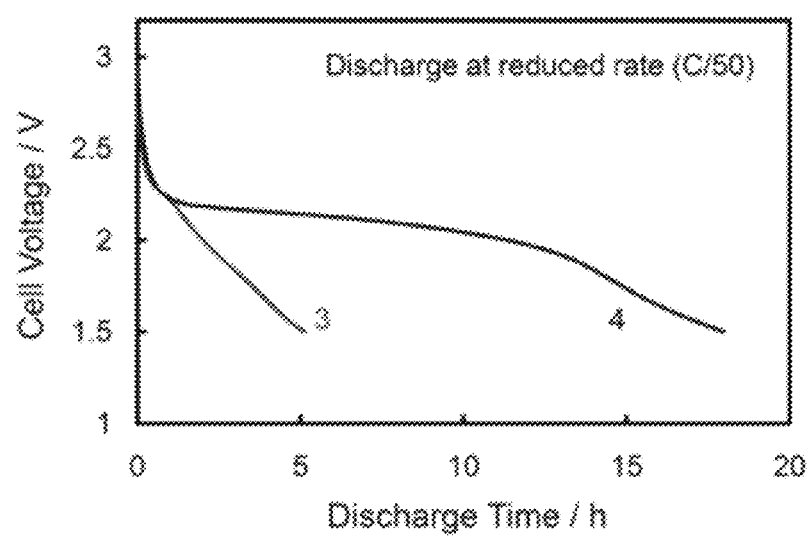

In this example, two composite cathodes having the compositions: Cell-3: 85% CF$_x$, 9% SAB-50, 1% carbon filament, and 5% PVDF and Cell-4: 80% CF$_x$, 5% Fe$_2$O$_3$, 9% SAB-50, 1% carbon filament, and 5% PVDF were prepared using the same method described in Example 1. Using these two cathodes, two coin cells were assembled and tested as the procedure described in Example 2. Discharge voltages of Cell-3 and Cell-4 are compared in FIGS. 4A-4B (curves 3 and 4), whereby FIG. 4A illustrates a regular discharge (i.e., discharge at 0.2 C) and FIG. 4B illustrates a continued discharge at a reduced rate (0.02 C) after the cells were discharged at 0.2 C to 1.5 V and then recovered by resting for 5 hours. In particular, as shown in FIG. 4A, Cell-4, made of the CF$_x$ cathode containing 5% Fe$_2$O$_3$ has higher voltages over whole the entire discharge period, and thus has an overall longer discharge time. After being discharged to 1.5 V, the cells were rested for 5 hours to recover their open circuit voltage (OCV), followed by a slow discharge at 0.02 C.

FIG. 4B illustrates a continued discharge at a reduced rate (0.02 C) after the cells were discharged at 0.2 C to 1.5 V and then recovered by resting for 5 hours. Further, FIG. 4B indicates that Cell-4 has a longer discharge time than Cell-3. The longer discharge time of Cell-4 suggests that the addition of Fe$_2$O$_3$ increases the utilization of the CF$_x$ active materials.

Example 4

Figure 5:
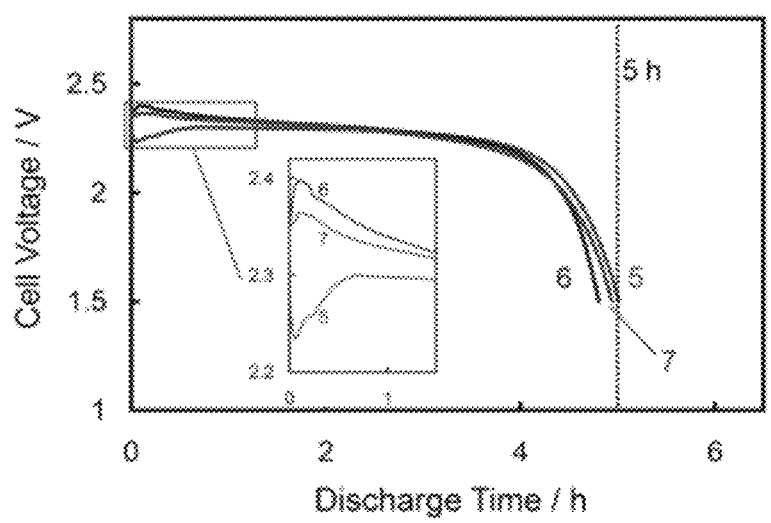
FIG. 5 illustrates a graph demonstrating the effect of the addition of non-electroactive metal oxide on discharge voltage, according to an embodiment described herein.
Figure 6:
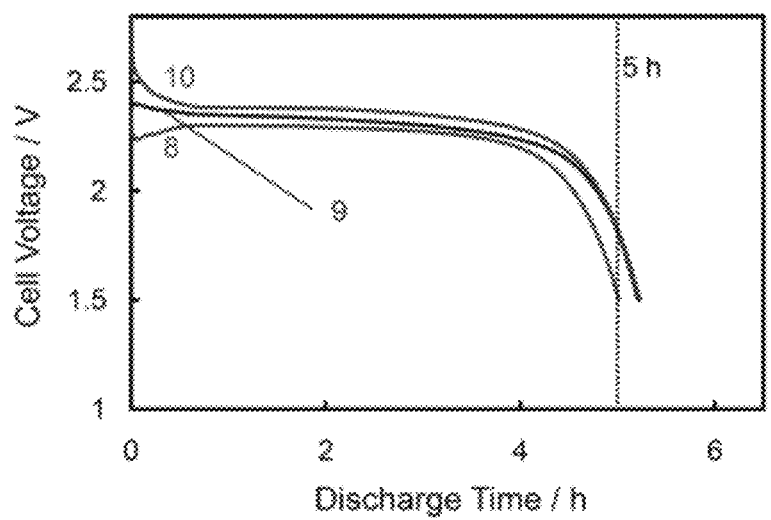
FIG. 6 illustrates a graph demonstrating the combined effect of using multiple oxide additives with a highly conductive carbon on discharge voltage, according to an embodiment described herein.

In this example, three composite cathodes having the compositions: Cell-5: 85% CF$_x$, 9% SAB-50, 1% carbon filament, and 5% PVDF; Cell-6: 80% CF$_x$, 5% Al$_2$O$_3$, 9% SAB-50, 1% carbon filament, and 5% PVDF; and Cell-7: 80% CF$_x$, 5% SiO$_2$, 9% SAB-50, 1% carbon filament, and 5% PVDF described were prepared using the same method described in Example 1. Using the above cathodes, three coin cells were assembled and tested as the procedure described in Example 2. FIG. 5 compares the discharge voltage curves 5, 6 and 7 of these three cells. FIG. 5 illustrates that that Cell-6 and Cell-7 have no voltage drop, while the control cell (Cell-5) suffers significant voltage drop at the beginning of discharge.

Example 5

In this example, three composite cathodes having the composition: Cell-8: 85% CF$_x$, 9% SAB-50, 1% carbon filament, and 5% PVDF; Cell-9: 80% CF$_x$, 2.5% Al$_2$O$_3$, 2.5% Fe$_2$O$_3$, 9% SAB-50, 1% carbon filament, and 5% PVDF; and Cell-10: 80% CF$_x$, 2.5% Al$_2$O$_3$, 2.5% Fe$_2$O$_3$, 9% XE-2, 1% carbon filament, and 5% PVDF were prepared using the same method described in Example 1. Using these three cathodes, three coin cells, numbered as Cell-8, Cell-9, and Cell-10 were assembled and tested as the procedure described in Example 2. Discharge voltage curves 8, 9 and 10 of these three cells are compared in FIG. 6. As compared with Cell-8, Cell-9 exhibits a significantly improved voltage in the beginning of discharge and it lasts lightly longer discharge time, showing significant improvement by the addition of Al$_2$O$_3$ and Fe$_2$O$_3$. By comparing Cell-9 and Cell-10, it is to be noted that further improvement is obtained by replacing SAB-50 with a highly conductive XE-2 carbon.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:
1. A composite cathode comprising:
    an electroactive cathode material of a single fluorinated carbon having a general formula of CFx, whereby x is an averaged value of from about 0.5 to about 1.2;
    a non-electroactive additive containing at least one oxide selected from the group consisting of Mg, B, Al, Si, Zn, Y, Ti, Zr, Fe, Co, and Ni;

a conductive agent selected from the group consisting of carbon, graphite, metals, and mixtures thereof;

a binder of an amorphous polymer selected from the group consisting of fluorinated polymers, ethylene-propylene-diene (EPDM) rubbers, styrene butadiene rubbers (SBR), poly (acrylonitdle-methyl methacrylate), carboxymethyl celluaoses (CMC), and poayvinyl alcohol (PVA);

wherein the non-electroactive additive is present in a percentage, by weight, ranging about 1% to about 10% of the total weight of the electroactive cathode material, the non-electroactive additive, the conductive agent, and the amorphous polymer binder; and wherein the composite cathode is for a lithium/fluorinated carbon (Li/CF$_x$) battery.

2. The composite cathode of claim 1, wherein the carbon in the electroactive cathode material CF$_x$ selected from the group consisting of cokes, carbon fibers, natural graphite, synthetic graphite and carbon blacks.

3. The composite cathode of claim 1, wherein the electroactive cathode material is present in a percentage, by weight, ranging about 60% to about 95% of the total weight of the electroactive cathode material, the non-electroactive additive, the conductive agent, and the amorphous polymer binder.

4. The composite cathode of claim 1, wherein the electroactive cathode material is present in a percentage, by weight, ranging about 70% to about 90% of the total weight of the electroactive cathode material, the non-electroactive additive, the conductive agent, and the amorphous polymer binder.

5. The composite cathode of claim 1, wherein the conductive agent is present in a percentage, by weight, ranging about 5% to about 15% of the total weight of the electroactive cathode material, the non-electroactive additive, the conductive agent, and the amorphous polymer binder.

6. The composite cathode of claim 1, wherein the binder is present in a percentage, by weight, ranging about 1% to about 10% of the total weight of the electroactive cathode material, the non-electroactive additive, the conductive agent, and the amorphous polymer binder.

7. The composite cathode of claim 1, wherein the non-electroactive additive contains at least two oxides selected from the group consisting of Mg, B, Al, Si, Zn, Y, Ti, Zr, Fe, Co, and Ni.

8. A method of reducing the initial voltage drop of a lithium/fluorinated carbon (Li/CF$_x$) battery comprising:

providing an electroactive cathode material according to claim 1 present in a percentage, by weight, ranging about 60% to about 95%;

providing a non-electroactive additive present in a percentage, by weight, ranging about 1% to about 10%;

providing a conductive agent present in a percentage, by weight, ranging about 5% to about 15%; and providing a binder present in a percentage, by weight, ranging from about 1% to about 10%.

9. The method of claim 8, wherein the electroactive cathode material is a single fluorinated carbon having a formula of CF$_x$, whereby x is an averaged value ranging from about 0.5 to about 1.2.

10. The method of claim 8, wherein the non-electroactive additive is at least one oxide of an element selected from the group consisting of Mg, B, Al Si, Cu, Zn, Y, Ti, Zr, Fe, Co, and Ni.

11. The method of claim 10, wherein the non-electroactive additive contains at least two oxides of elements selected from the group consisting of Mg, B, Al Si, Cu, Zn, Y, Ti, Zr, Fe, Co, and Ni.

12. The method of claim 8, wherein the conductive agent is selected from the group consisting of carbon, graphite, metals and mixtures thereof.

13. The method of claim 8, wherein the binder is an amorphous polymer selected from the group consisting of fluorinated polymers, ethylene-propylene-diene (EPDM) rubbers, styrene butadiene rubbers (SBR), poly (acrylonitrHe-methyl methacrylate), carboxymethyl cellunoses (CMC), and poJyvinyl alcohol (PVA).

14. A lithium/fluorinated carbon (Li/CFx) battery having a composite cathode comprising:

an electroactive cathode material of a single fluorinated carbon having a general formula of CF$_x$, whereby x is an averaged value ranging from about 0.5 to about 1.2;

a non-electroactive additive containing at least one oxide comprising an element selected from the group consisting of Mg, B, Al, Si, Cu, Zn, Y, Ti, Zr, Fe, Co, and Ni;

a conductive agent selected from the group comprising carbon, graphite, metals, and mixtures thereof;

a binder of an amorphous polymer selected from the group comprising fluorinated polymers, ethylene-propylene-diene (EPDM) rubbers, styrene butadiene rubbers (SBR), poly (acrylonitrile-methyl methacrylate), carboxymethyl celluloses (CMC), and polyvinyl alcohol (PVA); and wherein the non-electroactive additive is present in a percentage, by weight, ranging about 1% to about 10%.

15. The battery of claim 14 having a composite cathode, wherein the electroactive cathode material is present in a percentage, by weight, ranging about 60% to about 95%.

16. The battery of claim 14 having a composite cathode, wherein the conductive agent is present in a percentage, by weight, ranging about 5% to about 15%.

17. The battery of claim 14 having a composite cathode, wherein the binder is present in a percentage, by weight, ranging about 1% to about 10%.

18. The battery of claim 14 having a composite cathode, wherein the non-electroactive additive contains at least two oxides of elements selected from the group consisting of Mg, B, Al, Si, Cu, Zn, Y, Ti, Zr, Fe, Co, and Ni.

* * * * *